United States Patent [19]

Pusic

[11] Patent Number: 4,925,303

[45] Date of Patent: May 15, 1990

[54] AIRCRAFT PILOTING AID LASER LANDING SYSTEM

[76] Inventor: Pavo Pusic, Moluntska 6, Dubrovnik, Yugoslavia, 50000

[21] Appl. No.: 290,749

[22] Filed: Dec. 27, 1988

[51] Int. Cl.⁵ .............................................. G01C 21/00
[52] U.S. Cl. ................................. 356/152; 73/178 T; 340/952; 342/33
[58] Field of Search .............. 356/141, 152; 73/178 T; 340/952, 953; 342/33

[56] References Cited

U.S. PATENT DOCUMENTS 3,181,153  9/1959  Cella .
3,671,973  6/1972  Assouline et al. .
3,741,653  6/1973  Svetlinchny .
4,196,346  4/1980  McElhannon .

Primary Examiner—Charles T.3 Jordan
Assistant Examiner—Richard W. Wendtland

[57] ABSTRACT

A piloting aid system for landing an aircraft in either normal or adverse weather conditions is disclosed. The system applies a laser scanning process for determining and correcting the aircraft's position with respect to the commanded landing trajectory and for determining the aircraft's speed, altitude, and distance from the runway. The system provides the possibility to direct the aircraft exactly towards the runway longitudinal axis and to level the aircraft exactly parallel to the runway plane all along the landing trajectory and, consequently, to effect a safe landing under visibility conditions which would otherwise prevent landing.

5 Claims, 3 Drawing Sheets

AIRCRAFT PILOTING AID LASER LANDING SYSTEM

BACKGROUND OF THE INVENTION

The present invention relates to the navigation of an aircraft and in particular to a means for determining the position of an aircraft with respect to a runway.

Upon aircraft landing, adverse weather conditions such as heavy fog or rain, causing low visibility, can result in particularly hazardous conditions. Therefore, despite a sophisticated digital avionic system installed on the present generation of aircrafts which defines aircraft's altitude, speed, and distance from a runway with great precision, there are defined minimum weather conditions required before an aircraft can continue an approach to a landing. These weather conditions take into account the capabilities of the aircraft and the pilot, and the equipment installed at the airport and require minimum ceiling and minimum runway visibility because of possibility for an incident to occur. While making an instrumental approach, an incident may occur because of even small error, either of equipment installed at an airport or of an onboard avionic system. A missed approach, which results either in a go-around procedure and another attempt to land or a flight to an alternate airport, causes huge expenses to airline company and great inconvenience for passengers.

The well-known Instrument Landing System (ILS) and Microwave Landing System (MLS), together with other related means such as Distance Measuring Equipment (DME), provide the pilot and/or digital avionic system with accurate information for an approach and landing. These instruments provide a technique for reaching an end-of-descent point with great precision. Ideally, once cleared for descent, an aircraft is left alone to perform the descent from a top-of-descent point along descent path to an end-of-descent point where a final flare-out occurs.

A flare-out or flare, which is that portion of the landing trajectory between the fixed angle glide slope and the touchdown point on a runway, is the critical portion of the aircraft landing trajectory during which a pilot must decide either to continue the landing procedure or to abort the landing and effect the go-around. Since the systems disclosed in the prior art may not provide the pilot with a completely accurate position of the aircraft with respect to the runway longitudinal axis and plane due to the susceptibilities of the systems, visual contact is necessary to perform a completely safe landing. The visual contact with the runway must be possible before the point where the pilot can still effect a completely safe go-around procedure and, therefore, conditions where low visibility occurs, mostly due to heavy fog, prevent landing on airports sometimes for substantial periods of time.

Therefore, it is an object of the present invention to provide an inexpensive system which will enable the pilot to determine the position of the aircraft with respect to the runway with greater precision than when using only systems know in the prior art. It is an assumption that the present invention does not eliminate presently used systems and acts accordingly with any of them by supplying the digital avionic system with more accurate additional information regarding the aircraft position with respect to the runway.

The present invention enables the pilot to position the aircraft exactly towards the runway longitudinal axis and plane and effect a safe landing, even in almost zero-zero visibility conditions. Acting accordingly with existing systems, the present invention can be used as a reliable and independent secondary means of detecting an accidental error which may occur due to susceptibility of ILS' or MLS' means.

SUMMARY OF THE INVENTION

It has been proven that a laser beam can penetrate clouds, fog or rain for certain distances without losing its extremely high coherence and provide a nearly ideal straight line which approaches theoretical limits. In accordance with the present invention, it is assumed that the possibility for the laser beam to be blocked by fog, rain or snow can be ignored due to relatively short distance wherein the laser beam is to be applied for this purpose and considering that heavy fog (which in most cases causes low visibility and prevents landing) almost never occurs together with rain or snow. A narrowness of the laser beam permits sharp definition of targets and, therefore, lasers can serve as fast, high-resolution devices for determining the aircraft's position, speed, distance from the runway, and altitude.

In accordance with the present invention, two laser beams emitted from two different positions on an aircraft are used to scan reflective and non-reflective areas located on both sides of the runway. According to returns received from the reflective areas along both sides of the runway, highly accurate position, speed, distance from the runway, and altitude can be calculated. With the assumption that the reflective and non-reflective areas on both sides of the runway represent exactly the same values, divergence from course (runway longitudinal axis and plane) can be derived from different returns. Also, due to the characteristic of the laser beam, the aircraft's speed, distance from the runway, and altitude can be calculated.

In accordance with the present invention, the aircraft starts emitting laser beams at the defined point on its descending path and continues this procedure without interruption to the final touch-down. Returns from the reflective areas are continuously compared by the onboard computer which indicates to the pilot and/or digital avionic system any divergence from the commanded descending and flare path. Information captured by such laser scanning procedure enables extremely accurate positioning of the aircraft with respect to the runway longitudinal axis and plane and, therefore, will enable safe landing even in adverse weather conditions which do not satisfy current requirements for minimum ceiling and runway visual range.

The present invention can also be used to provide a pilot of an aircraft landing on an aircraft carrier with more accurate information about speed, distance from runway, altitude, and position with respect to the aircraft carrier runway longitudinal axis and plane.

All features and advantages of the present invention will become apparent from the following brief description of drawings and description of the preferred embodiment.

DETAILED DESCRIPTION OF THE PREFERRED EMBODIMENT

Figure 1:
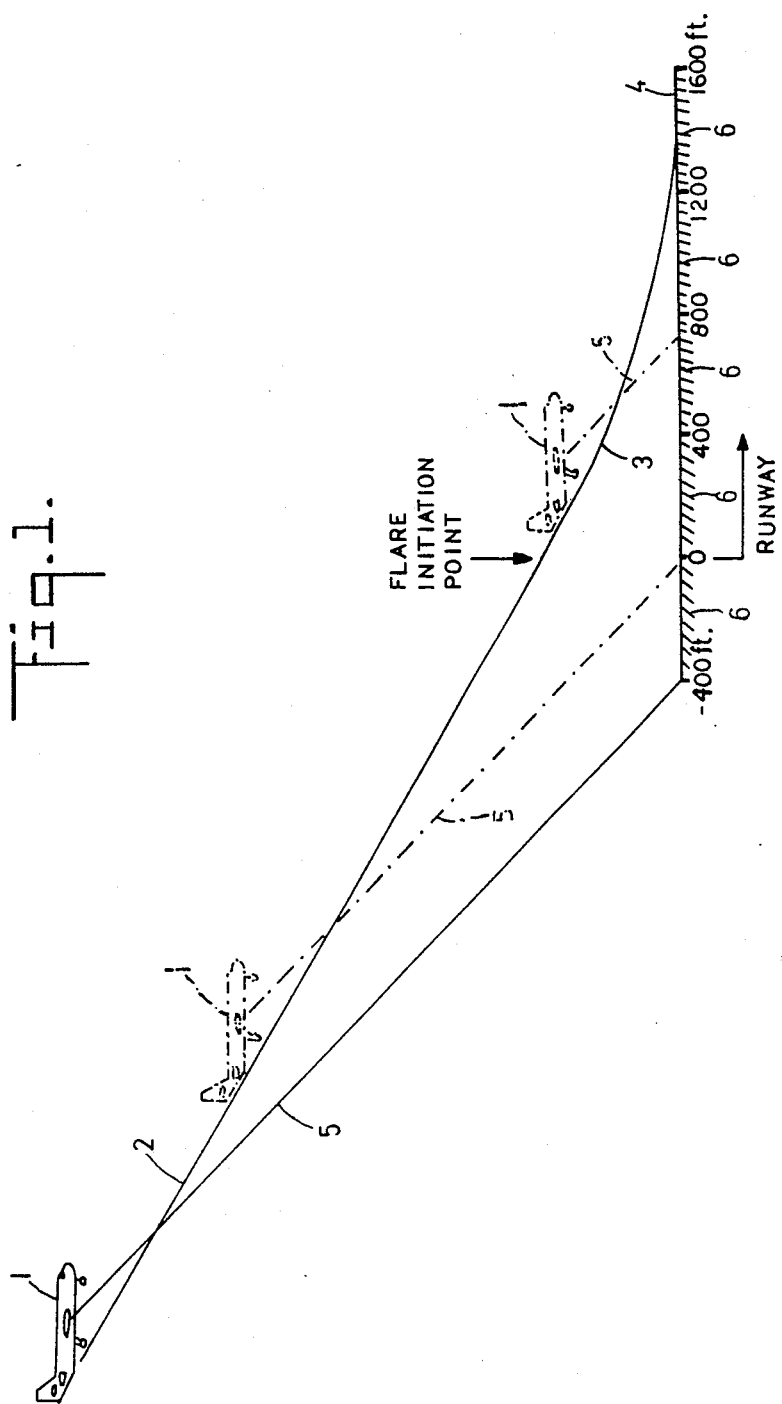
FIG. 1 is the graph showing the aircraft's landing trajectory for landing on a standard runway.

Referring to FIG. 1, there is shown the part of the aircraft landing trajectory comprising the final section of the portion known as a descending path 2 and the portion known as the flare path 3, wherein the descending path is defined at the fixed angle with respect to the runway 4 and the flare path 3 starts at the flare initiation point and terminates at the touch-down point on the runway 4. The descending path 2, which starts at a top-of-descent point (not shown on FIGS.) and goes along a glide slope signal, terminated at the end-of-descent point which is also defined as the flare initiation point.

Once cleared for descent, the aircraft performs the descent along the defined glide slope transmitted either by ILS glide slope transmitter or MLS elevation transmitter. As known from the prior art, ILS provides ±2° glide slope coverage and ±2° localizer coverage while MLS provides 20° elevation coverage and ±60° azimuth coverage.

Figure 3:
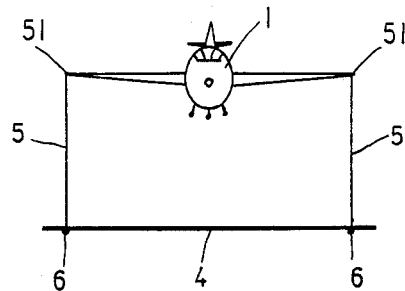
FIG. 3 is the graph showing the front view of the approaching aircraft.

In accordance with the present invention, the approaching aircraft 1 is provided with two laser transmitters and two receivers 51, preferably located in the far ends of the aircraft's wings as shown on FIG. 3. The runway is provided with the reflective areas 6 which are preferably located along both sides of the runway 4 as shown on FIGS. 1 and 3. The reflective 6 and nonreflective areas, arranged in a chipper set format, are stationary and positioned at different angles required for the purpose of reflecting laser beams 5, shown on FIGS. 1 and 3, which are transmitted from the aircraft's different positions along the descending 2 and the flare path 3. It is assumed that only the reflective areas 6 have to be built along the runway sides. The remaining runway surface will serve as non-reflective areas due to its inability to reflect the laser beams at the required angle.

According to the requirements, the reflective areas 6 can be located all along the runway 4 or only along the portion of the runway 4 from its beginning to the touch-down point. Preferably, the reflective areas are located from a certain defined point in front of the runway 4 to the touch-down point, as shown on FIG. 1.

Figure 2:
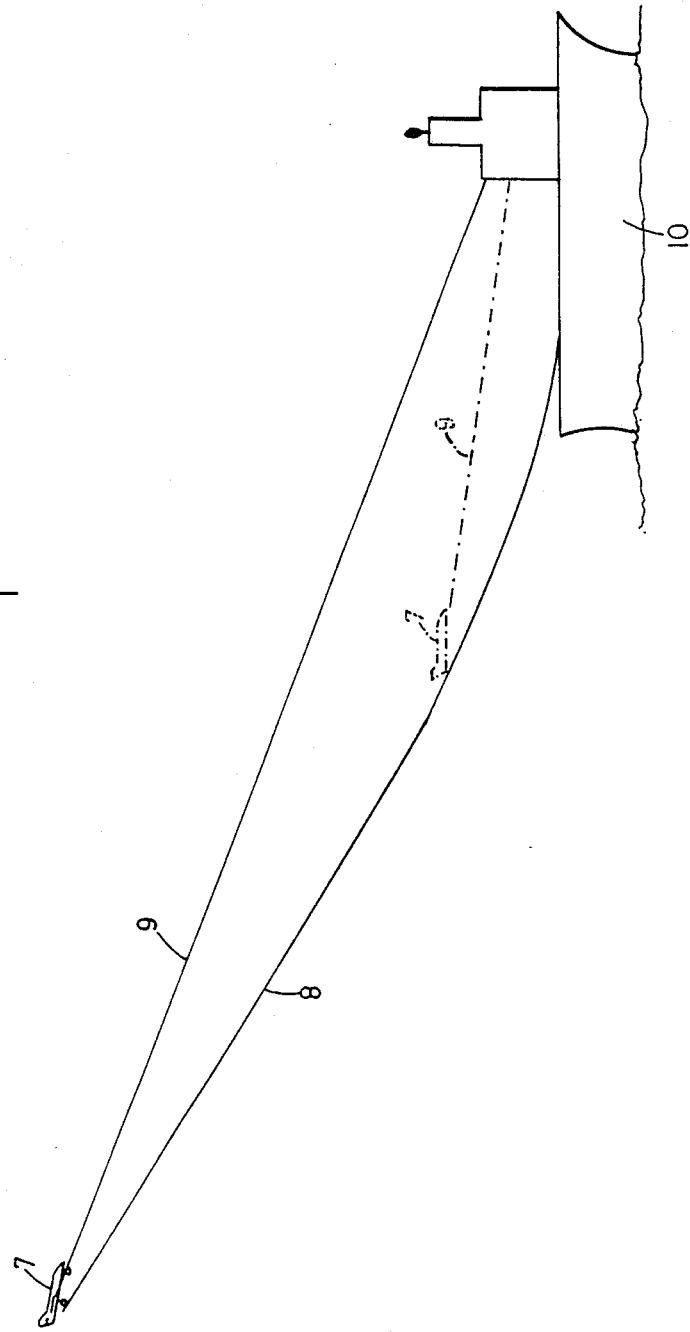
FIG. 2 is the graph showing the aircraft's landing trajectory for landing on an aircraft carrier runway.

In the case of the aircraft 7 landing on the aircraft carrier 10 the reflective areas can be located vertically on both sides of the carrier runway, as shown on FIG. 2.

In order to enable different types of aircrafts to use the same reflective areas 6 on the runway 4, it is assumed that the onboard laser equipment 51 is located correspondingly on each type of aircraft. Also, in order to obtain the exact direction of the laser beams 5, the fact that the technique for construction of the descent path by flight management computer system is based on the idle thrust performance of a specific aircraft has to be taken into consideration. The reflective 6 and non-reflective areas along the runway 4 sides can have any "1" or "0" order, wherein "1" represents reflective portion of the surface and "0" represents nonreflective portion of the surface and wherein each individual "1" and each individual "0" has the same height (width) value. The applied order has to have a ratio which provides a digital avionic system and/or pilot with accurate information, with the assumption that this system is activated after receiving ILS or MLS guidance signals where the actual aircraft position does not provide any reasonable possibility for an accidental error regarding the laser beam returns.

It is assumed that at this particular moment (beginning of scanning process) the aircraft 1 heads towards the runway 4 and that actual position of its laser equipment 51 does not allow the possibility to make an error regarding the scanning of two sets of the reflective areas 6 which are located on the opposite sides of the runway 4. Therefore, there is not possibility to obtain returns which may provide inaccurate data and mislead the digital avionic system and/or the pilot.

It is to be understood that the reflective 6 and non-reflective areas may be located beside the runway 4 sides and that the aircraft onboard laser equipment. 51 does not have to be stationary, if proven more efficient for the purpose of the invention. Regardless of their location, both the onboard transmitters and receivers 51, and the runway reflective areas 6 have to be positioned in a manner which ensures proper scanning in accordance to the determined landing trajectory 2 and 3. The same principle has to be applied in the case of landing on the aircraft carrier 10 wherein the reflective and non-reflective areas are preferably vertically positioned for purpose of more efficient scanning Ideally, the reflective areas 6 are located along both sides of the runway 4 equidistantly to the runway longitudinal axis. The distance between the left and right reflective areas 6 corresponds to the distance between the onboard transmitters and receivers 51 which are also positioned exactly equidistantly with respect to the aircraft's longitudinal axis. The reflective areas are also positioned in accordance to the runway's plane.

While the scanning process described herebelow corresponds to one wherein helium-neon laser and photodiode are most commonly applied, it is to be understood that this does not represent a limitation for the present invention. Any kind of laser can be used according to the most optimal performance and considering all involved factors during a landing process under adverse weather conditions.

In accordance with the present invention, the approaching aircraft 1 starts emitting the laser beams 5 from two laser transmitters 51 at the defined point of its descent path 2, as shown on FIG. 1. The transmitters 51 are located on both aircraft's wings. The laser beams 5 are emitted at the defined angle in accordance with the calculated descent path 2 and configuration of the reflective areas 6. As the aircraft 1 descends, the emitted laser beams 5 move forward over the reflective 6 and non-reflective areas located in front and along the runway 4. As the beams 5 move over the reflective areas 6, they are reflected back to the receivers according to the height (width) difference of these areas. Any divergence between two simultaneously reflected returns can be observed with great precision. The returns will diverge in the case of any incorrectness in the aircraft's position with respect to the runway longitudinal axis and plane. The reflected returns are captured by the receivers and processed by the onboard computer 11.

The information obtained from the reflected returns are compared with each other and according to their divergence the computer 11 defines the position of the aircraft 1 with respect to the runway 4. If there is no divergence between the two simultaneous returns the aircraft 1 is correctly positioned. All processed information are permanently transmitted to Flight Management Computer System (FMCS) in order to be compared with corresponding data obtained from other avionic system's means and, if required, to correct the aircraft 1 position. Simultaneously, by measuring the frequency between the original 5 and reflected beams (Dopper Effect) the speed of the aircraft 1 is calculated and since the speed of light is known, by measuring the time taken for the beam 5 to reach and return from the reflective areas 6 the distance from runway 4 is also calculated. In addition, since the beam 5 angle, aircraft 1 speed, and distance from runway are known, the altitude is also calculated. All these data are also transmitted to FMCS to be compared with corresponding data obtained from other avionic system's means, in order to detect possible accidental error and properly position the aircraft 1.

The process is continued along the entire descent path 2 (as shown in dotted lines on FIG. 1) enabling the aircraft 1 to descend on the fixed angle glide slope in an extremely precise position with respect to the runway longitudinal axis and plane due to the fact that any divergence between two simultaneous reflected returns is almost instantly indicated to FMCS. Since the most important purpose of the invention is to enable safe landing under low visibility conditions caused by fog or clouds which almost never occur together with a strong wind, it is assumed that the possibility that one or both of the aircraft's wings (where laser equipment 51 is located) vibrates due to strong wind can be ignored.

After the aircraft 1 leaves the fixed angle glide slope at the flare initiation point, the above described scanning process is continued, as shown by the dotted lines on FIG. 1. The laser beams 5 are emitted at the same fixed angle with respect to the aircraft's body but the reflective areas 6 are positioned at different angles which correspond to changes of the angle of the emitted laser beams 5 with respect to the runway 4. This change of the beam's 5 angle with respect to the runway 4 is caused by the different horizontal positions of the aircraft's longitudinal axis during the flare 3. Along the flare portion 3 of the landing trajectory, reflected returns are captured, processed, and transmitted to FMCS exactly as previously described for the descent path portion 2 of the landing trajectory. Correspondingly, during the flare portion 3 of the landing trajectory the present invention enables extremely proper positioning of the aircraft with respect to the runway 4 and eliminates the need for minimum vertical and horizontal visual range required for safe landing for the systems known in the prior art.

If the reflective areas 6 and onboard laser equipment 51 are designed for the purpose of taxiing procedure, the aircraft can be guided by a scanning procedure all the way to the terminal even under zero-zero visibility conditions.

Figure 4:
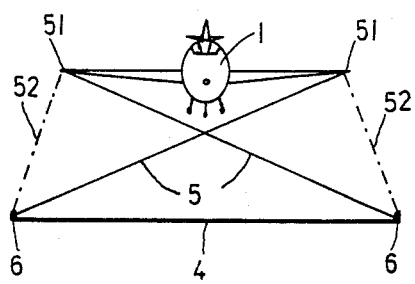
FIG. 4 is the graph showing the front view of the approaching aircraft in the case where the reflected returns are captured by the receiver located on the opposite wing with respect to the laser beam transmitter.
Figure 5:
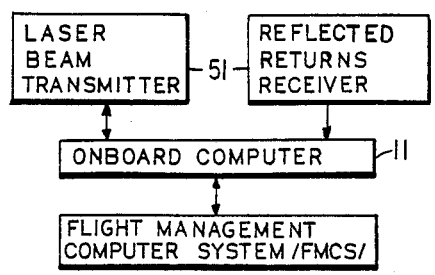
FIG. 5 is the block diagram of the invention.

If proven more efficient for the purpose of the present invention, the reflective areas 6 can be located in front and beside the runway 4, as shown on FIG. 4, having a distance wider than the aircraft's wingspan. Unlike for the above described process, wherein the laser beams 5 are reflected to the receiver located on the same side, in this case the laser beams 5 are reflected to the opposite wing and the returns 52 are captured by the receiver located opposite to the transmitter, as shown by the dotted lines on FIG. 4. Accordingly, the beam 5 from the transmitter on the left wing produces the return 52 to the receiver on the right wing and vice versa. The reflective areas 6 have to be positioned in a manner suitable for said reflecting purposes and the beams 5 have to be emitted in a manner that prevent their collision when the aircraft's wings are in horizontal position which corresponds to the horizontal position of the runway 4 plane.

The scanning process corresponds to the previously described one, with respect to certain differences which will occur due to the slightly different angles of the simultaneously emitted beams 5. These differences will be solved by the process of the onboard computer 11 which further transmits information to FMCS as described in the previous process.

In the case of the aircraft 7, FIG. 2, landing on the aircraft carrier 10, the previously described scanning process is performed along the landing trajectory 8. The laser beams 9 transmitters and receivers 51 are also located in both aircraft wings as previously described and the reflective and non-reflective areas are located on the carrier 10, preferably in vertical position. Refelcted returns are captured, processed, and transmitted according to the prevously described process. As previously stated regarding the aircraft 1 landing on the runway 4, it is also to be understood that location, position, and movability of both onboard laser equipment 5 and the reflective areas on the aircraft carrier do not represent limitations regarding the application of the present invention for landing on the aircraft carrier.

It is also to be understood that any configuration can be applied, if proven more efficient for the purpose of the present invention including the possibility for reverse location of the laser equipment 51 and the reflective areas 6 wherein the laser transmitters and receivers are located on the runway and returns are obtained from the body of the aircraft.

Under the assumption that the reflective areas 6 are built in the manner to serve this purpose, the present invention can also be applied in order to perform a completely safe take-off under zero-zero visibility conditions. In dependance to the position of the reflective areas 6, this situation may demand that the laser transmitters are movable in order to be able to emit the laser beams 5 towards the reflective areas under the required angle. In accordance with the present invention, the aircraft is guided by the scanning procedure while taxiing to the take-off starting point under zero-zero visibility conditions. During the take-off procedure the laser equipment scans the reflective areas 6 (in the manner as previously described) and the aircraft is permanently positioned exactly towards the runway longitudinal axis which enables a completely safe take-off procedure.

It will be understood that the present invention has been described in relation to the particular embodiment, herein chosen for the purpose of illustration and that the claims are intended to cover all changes and modifications, apparent to those skilled in the art, which do not constitute departure from the scope and spirit of the invention.

What is claimed is:

1. A method of determining an aircraft's actual position, speed, altitude, and distance from the landing runway said aircraft is approaching, comprising the steps of:

emitting laser beams from at least two laser transmitting means located in proximity of each wing tip of said aircraft;

reflecting a portion of said laser beams backwards to said aircraft in accordance with a predetermined pattern;

receiving said reflected laser beams by at least two on board laser receiving means;

processing data about said emitted laser beams and said reflected laser beams and transmitting said data to an avionic system for monitoring and correcting said aircraft's position, and detecting an accidental error of any of the other on board avionic system's means.

2. A piloting aid system for aiding in landing of an aircraft on the landing runway said aircraft is approaching, said system comprising:

at least two transmitting-receiving apparatuses located in proximity of each wing tip of said aircraft for emitting laser beams and receiving reflected returns of said laser beams;

on board computer means coupled to said transmitting-receiving apparatuses for controlling the process of said apparatuses, processing data obtained from said apparatuses, and transmitting said data to an avionic system;

laser beams' reflecting means located along both sides of said landing runway for reflecting said laser beams in accordance with a predetermined pattern, said reflecting means positioned parallel to a longitudinal axis of said runway and being equidistant with respect to said runway's longitudinal axis.

3. The system according to claim 2, wherein said transmitting-receiving apparatuses further comprise:

transmitting means for emitting said laser beams and transmitting data about said emitting to said computer means;

receiving means coupled to said transmitting means for receiving said reflected returns and transmitting data about said reflected returns to said computer means.

4. The system according to claim 2, wherein said computer means further comprises:

processing means coupled to said transmitting means and to said receiving means for processing said data obtained from said transmitting means and said receiving means, for determining actual position of said aircraft with respect to said landing runway, and for determining said aircraft's actual speed, altitude, and distance from said landing runway;

transmitting means coupled to said processing means for transmitting said data about said aircraft's actual position, speed, altitude, and distance from said runway to said avionic system.

5. The system according to claim 2, wherein said reflecting means include reflective and non-reflective sections for either reflecting or absorbing (deflecting) said laser beams in accordance with said predetermined pattern.

* * * * *